(12) United States Patent
Nakayama et al.

(10) Patent No.: US 12,066,201 B2
(45) Date of Patent: Aug. 20, 2024

(54) AIR CONDITIONING SYSTEM HAVING A NORMAL CONTROL MODE AND MULTI-TENANT CONTROL MODE

(71) Applicant: DAIKIN INDUSTRIES, LTD., Osaka (JP)

(72) Inventors: Kazuhiro Nakayama, Osaka (JP); Atsushi Okamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/614,878

(22) PCT Filed: May 22, 2020

(86) PCT No.: PCT/JP2020/020358
§ 371 (c)(1),
(2) Date: Nov. 29, 2021

(87) PCT Pub. No.: WO2020/241507
PCT Pub. Date: Dec. 3, 2020

(65) Prior Publication Data
US 2022/0146131 A1 May 12, 2022

(30) Foreign Application Priority Data
May 31, 2019 (JP) ................. 2019-102620

(51) Int. Cl.
*F24F 11/32* (2018.01)
*F24F 1/0007* (2019.01)
(Continued)

(52) U.S. Cl.
CPC ............ *F24F 11/32* (2018.01); *F24F 1/0007* (2013.01); *F24F 11/46* (2018.01); *F24F 11/526* (2018.01); *F24F 11/54* (2018.01); *F24F 11/89* (2018.01)

(58) Field of Classification Search
CPC .......... F24F 1/0007; F24F 11/32; F24F 11/46; F24F 11/526; F24F 11/54; F24F 11/89
See application file for complete search history.

(56) References Cited

U.S. PATENT DOCUMENTS

| | | | |
|---|---|---|---|
| 9,097,448 B2 * | 8/2015 | Jung | F25B 49/02 |
| 2010/0019574 A1 * | 1/2010 | Baldassarre | H02J 9/06 |
| | | | 307/64 |

(Continued)

FOREIGN PATENT DOCUMENTS

| | | | | |
|---|---|---|---|---|
| EP | 3382294 A1 * | 10/2018 | | F24F 11/49 |
| JP | 2001-108277 A | 4/2001 | | |

(Continued)

OTHER PUBLICATIONS

English translation of the International Preliminary Report on Patentability and Written Opinion of the International Searching Authority for International Application No. PCT/JP2020/020358, dated Dec. 8, 2021.

(Continued)

*Primary Examiner* — Jonathan Bradford
(74) *Attorney, Agent, or Firm* — BIRCH, STEWART, KOLASCH & BIRCH, LLP

(57) ABSTRACT

Provided is an air conditioning system capable of detecting in advance a device that consumes more power than the power that can be fed by a power feed unit. An air conditioning system includes a refrigerant cycle, a power feed unit, and a controller. The refrigerant cycle includes an outdoor unit and a plurality of indoor units. In a case where a power source for at least one indoor unit of the plurality of indoor units has been interrupted, the power feed unit feeds power from an auxiliary power source to the indoor unit for which the power source has been interrupted. When a predetermined device has been connected to at least part of (Continued)

the plurality of indoor units and the power feed unit, the controller performs deactivation of at least one of functions of the device.

11 Claims, 5 Drawing Sheets

(51) Int. Cl.
*F24F 11/46* (2018.01)
*F24F 11/526* (2018.01)
*F24F 11/54* (2018.01)
*F24F 11/89* (2018.01)

(56) References Cited

U.S. PATENT DOCUMENTS

2017/0198943 A1* 7/2017 Oka .................. F25B 49/02
2017/0356663 A1* 12/2017 Couperthwaite ....... F28F 13/06

FOREIGN PATENT DOCUMENTS

| JP | 2004-44979 A | 2/2004 |
| JP | 2005-45866 A | 2/2005 |
| JP | 2007-93138 A | 4/2007 |
| JP | 2013-40698 A | 2/2013 |
| JP | 2014-196872 A | 10/2014 |
| JP | 2016-109341 A | 6/2016 |

OTHER PUBLICATIONS

International Search Report for PCT/JP2020/020358 (PCT/ISA/210) mailed on Aug. 11, 2020.
Extended European Search Report issued Jun. 28, 2022 in corresponding European Application No. 20813503.8.

* cited by examiner

AIR CONDITIONING SYSTEM HAVING A NORMAL CONTROL MODE AND MULTI-TENANT CONTROL MODE

TECHNICAL FIELD

An air conditioning system

BACKGROUND ART

There has been known an air conditioning system capable of continuing an air conditioning operation even if a power source for one or some of indoor units is interrupted, as disclosed in PTL 1 (Japanese Unexamined Patent Application Publication No. 2013-40698).

SUMMARY OF INVENTION

Technical Problem

There is an issue that, when a power source for one or some of indoor units is interrupted and power is fed from a power feed unit to the indoor unit for which the power source has been interrupted, if a device that consumes more power than the power fed by the power feed unit is connected to the indoor unit, power feed to the device is insufficient and a malfunction occurs in the air conditioning system.

Solution to Problem

An air conditioning system according to a first aspect includes a refrigerant cycle, a power feed unit, and a controller. The refrigerant cycle includes an outdoor unit and a plurality of indoor units. In a case where a power source for at least one indoor unit of the plurality of indoor units has been interrupted, the power feed unit feeds power from an auxiliary power source to the indoor unit for which the power source has been interrupted. When a predetermined device has been connected to at least part of the plurality of indoor units and the power feed unit, the controller performs at least one of notification of a state of the device and deactivation of at least one of functions of the device.

The air conditioning system according to the first aspect is capable of detecting in advance a device that consumes more power than the power that can be fed by the power feed unit.

An air conditioning system according to a second aspect is the air conditioning system according to the first aspect, in which the controller performs at least one of the notification and the deactivation when the device that consumes power exceeding a predetermined threshold has been connected.

The air conditioning system according to the second aspect is capable of detecting in advance a device that consumes more power than the power that can be fed by the power feed unit.

An air conditioning system according to a third aspect is the air conditioning system according to the first aspect or the second aspect, in which the controller performs the notification by issuing a warning using at least one of sound, light, and display.

The air conditioning system according to the third aspect enables a worker or the like to grasp in advance the presence of a device that consumes more power than the power that can be fed by the power feed unit.

An air conditioning system according to a fourth aspect is the air conditioning system according to any one of the first to third aspects, in which the device includes at least a humidifier connected to the indoor unit, and a drain pump that operates in conjunction with the humidifier. The controller performs the deactivation by stopping conjunction between the humidifier and the drain pump when the device has been connected.

The air conditioning system according to the fourth aspect is capable of detecting in advance a device that consumes more power than the power that can be fed by the power feed unit.

An air conditioning system according to a fifth aspect is the air conditioning system according to any one of the first to fourth aspects, in which the controller does not stop operation of the outdoor unit in a case where operation of the indoor unit has stopped with the device being connected to the indoor unit.

The air conditioning system according to the fifth aspect is capable of, even when operation of one indoor unit has been stopped, continuing operation of the other indoor units.

An air conditioning system according to a sixth aspect is the air conditioning system according to any one of the first to fifth aspects, in which the controller stops operation of the indoor units and the outdoor unit in a case where a predetermined anomaly has been detected in the refrigerant cycle.

The air conditioning system according to the sixth aspect is capable of securing safety even when an anomaly has occurred in the refrigerant cycle.

DESCRIPTION OF EMBODIMENTS

First Embodiment

An air conditioning system 100 according to a first embodiment will be described with reference to the drawings.

(1) Configuration of Air Conditioning System 100

Figure 1:
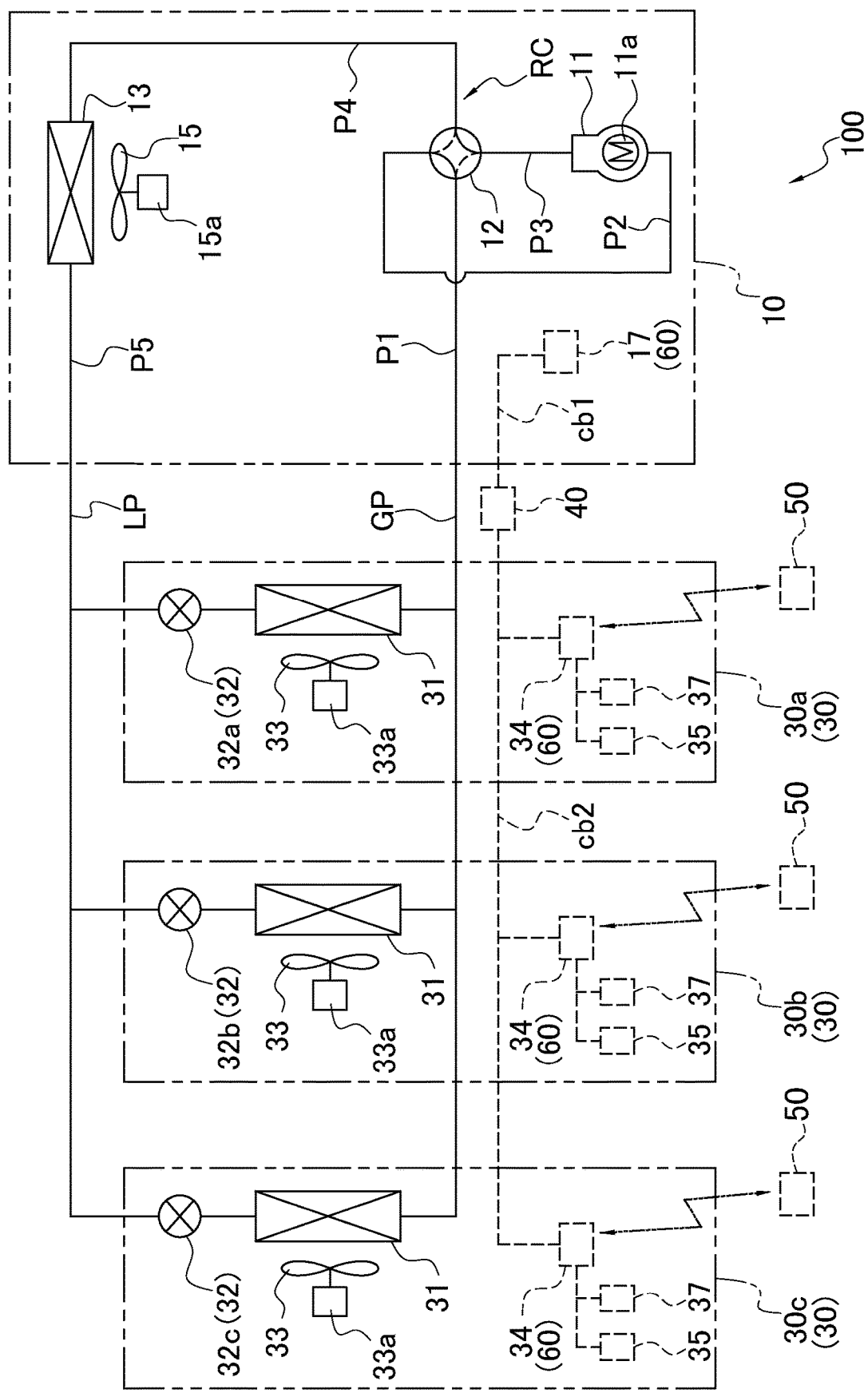
FIG. 1 is a schematic configuration diagram of an air conditioning system 100 according to a first embodiment.

FIG. 1 is a schematic configuration diagram of the air conditioning system 100 according to the present embodiment. The air conditioning system 100 is a system for implementing air conditioning, such as cooling and heating, in a target space included in a structure, such as a house, a building, a factory, or a public facility.

The air conditioning system 100 includes a refrigerant circuit RC in which refrigerant circulates. The air conditioning system 100 performs a vapor-compression refrigeration cycle by causing refrigerant to circulate in the refrigerant circuit RC, thereby cooling or heating a target space. Refrigerant such as R410A, R32, or ammonia is sealed in the refrigerant circuit RC.

The air conditioning system 100 mainly includes one outdoor unit 10 serving as a heat source unit, a plurality of (three in FIG. 1) indoor units 30 (30a, 30b, 30c) serving as use units, one power feed unit 40, a plurality of (three in FIG. 1) remote controllers 50, and a controller 60. The refrigerant circuit RC of the air conditioning system 100 is constituted by the outdoor unit 10 and the individual indoor units 30 that are connected by a gas connection pipe GP and a liquid connection pipe LP. In other words, the air conditioning system 100 is a multi-type (multi-tenant) air conditioning system in which the plurality of indoor units 30 are connected to an identical refrigerant system.

(1-1) Outdoor Unit 10

The outdoor unit 10 is an outdoor unit installed outdoors (outside a target space). The outdoor unit 10 mainly includes a plurality of refrigerant pipes (first to fifth pipes P1 to P5), a compressor 11, a four-way switching valve 12, an outdoor heat exchanger 13, an outdoor fan 15, and an outdoor-unit control unit 17.

The first pipe P1 is a refrigerant pipe that connects the gas connection pipe GP and the four-way switching valve 12. The second pipe P2 is a suction pipe that connects the four-way switching valve 12 and a suction port (not illustrated) of the compressor 11. The third pipe P3 is a discharge pipe that connects a discharge port (not illustrated) of the compressor 11 and the four-way switching valve 12. The fourth pipe P4 is a refrigerant pipe that connects the four-way switching valve 12 and a gas side of the outdoor heat exchanger 13. The fifth pipe P5 is a refrigerant pipe that connects a liquid side of the outdoor heat exchanger 13 and the liquid connection pipe LP.

The compressor 11 is a mechanism that sucks and compresses low-pressure gas refrigerant and discharges resultant refrigerant. The compressor 11 has an enclosed structure including a compressor motor 11a built therein. In the compressor 11, a compression element (not illustrated) of a rotary type, a scroll type, or the like accommodated in a compressor casing (not illustrated) is driven by the compressor motor 11a serving as a drive source. While operating, the compressor motor 11a is inverter-controlled and the number of rotations thereof is adjusted in accordance with a situation. When being driven, the compressor 11 sucks refrigerant through the suction port, compresses the refrigerant, and discharges the refrigerant through the discharge port.

The four-way switching valve 12 is a valve for switching a direction in which refrigerant flows in the refrigerant circuit RC. The four-way switching valve 12 is individually connected to the first pipe P1, the second pipe P2, the third pipe P3, and the fourth pipe P4. During a cooling operation, the four-way switching valve 12 switches a flow path such that the first pipe P1 and the second pipe P2 are connected to each other and that the third pipe P3 and the fourth pipe P4 are connected to each other (see solid lines in the four-way switching valve 12 in FIG. 1). During a heating operation, the four-way switching valve 12 switches a flow path such that the first pipe P1 and the third pipe P3 are connected to each other and that the second pipe P2 and the fourth pipe P4 are connected to each other (see broken lines in the four-way switching valve 12 in FIG. 1).

The outdoor heat exchanger 13 is a heat exchanger that functions as a condenser or radiator for refrigerant during a cooling operation and that functions as an evaporator for refrigerant during a heating operation. The outdoor heat exchanger 13 includes a heat transfer tube (not illustrated) through which refrigerant flows, and a heat transfer fin (not illustrated) that increases a heat transfer area. The outdoor heat exchanger 13 is disposed such that refrigerant in the heat transfer tube and an air flow generated by the outdoor fan 15 are capable of exchanging heat during an operation.

The outdoor fan 15 is, for example, a propeller fan. The outdoor fan 15 is connected to an output shaft of an outdoor fan motor 15a and is driven in conjunction with the outdoor fan motor 15a. When being driven, the outdoor fan 15 generates an air flow that flows into the outdoor unit 10 from the outside and flows out of the outdoor unit 10 after passing through the outdoor heat exchanger 13.

The outdoor-unit control unit 17 is a microcomputer constituted by a CPU, a memory, and so forth. The outdoor-unit control unit 17 controls operations of individual actuators of the outdoor unit 10. The outdoor-unit control unit 17 is connected to indoor-unit control units 34 (described below) of the respective indoor units 30 via communication lines cb1 and cb2 and the power feed unit 40, and transmits a signal thereto or receives a signal therefrom.

(1-2) Indoor Units 30 The indoor units 30 (30a, 30b, 30c) are indoor units installed in a target space. The indoor units 30 constitute the refrigerant circuit RC together with the outdoor unit 10. The indoor units 30 each mainly include an indoor heat exchanger 31, an expansion valve 32 (32a, 32b, 32c), an indoor fan 33, and an indoor-unit control unit 34.

The indoor heat exchanger 31 is a heat exchanger that functions as an evaporator for refrigerant during a cooling operation and that functions as a condenser or radiator for refrigerant during a heating operation. The indoor heat exchanger 31 is, for example, a cross-finned tube heat exchanger. A liquid side of the indoor heat exchanger 31 is connected to a refrigerant pipe extending to the expansion valve 32 (32a, 32b, 32c). A gas side of the indoor heat exchanger 31 is connected to a refrigerant pipe extending to the gas connection pipe GP. The indoor heat exchanger 31 is disposed such that refrigerant in a heat transfer tube (not illustrated) and an air flow generated by the indoor fan 33 are capable of exchanging heat during an operation.

The expansion valve 32 (32a, 32b, 32c) is an electric valve capable of adjusting the opening degree thereof. During an operation, the expansion valve 32 is adjusted in the opening degree as appropriate in accordance with a situation, and decompresses refrigerant in accordance with the opening degree. Each indoor unit 30 includes one expansion valve 32. Specifically, the indoor unit 30a includes the expansion valve 32a, the indoor unit 30b includes the expansion valve 32b, and the indoor unit 30c includes the expansion valve 32c. The opening degrees of the expansion valves 32a, 32b, and 32c are adjusted as appropriate in accordance with operation statuses of the indoor units 30a, 30b, and 30c, respectively.

The expansion valve 32 is connected to a refrigerant pipe extending to the liquid side of the indoor heat exchanger 31 and a refrigerant pipe extending to the liquid connection pipe LP. The liquid connection pipe LP connects the fifth pipe P5 of the outdoor unit 10 and the individual expansion valves 32. One end of the liquid connection pipe LP is connected to the fifth pipe P5. The other end of the liquid connection pipe LP branches off in accordance with the number of expansion valves 32 and is individually connected to each of the expansion valves 32.

The indoor fan 33 is, for example, a fan such as a turbofan, a sirocco fan, a cross-flow fan, or a propeller fan. The indoor fan 33 is connected to an output shaft of an indoor fan motor 33a. The indoor fan 33 is driven in conjunction with the indoor fan motor 33a. When being driven, the indoor fan 33 generates an air flow that is sucked into the indoor unit 30 and is blown out to a target space after passing through the indoor heat exchanger 31.

The indoor-unit control unit 34 is a microcomputer constituted by a CPU, a memory, and so forth. The indoor-unit control unit 34 controls operations of individual actuators of the indoor unit 30. Each indoor-unit control unit 34 is connected to the outdoor-unit control unit 17 via the communication lines cb1 and cb2 and the power feed unit 40, and transmits a signal thereto or receives a signal therefrom. The indoor-unit control unit 34 wirelessly communicates with the remote controller 50.

The indoor-unit control unit 34 of each indoor unit 30 is connected to the expansion valve 32 of the indoor unit 30 via a communication line (not illustrated) and is capable of adjusting the opening degree of the expansion valve 32.

(1-3) Power Feed Unit 40

The power feed unit 40 is connected to the outdoor-unit control unit 17 and the individual indoor-unit control units 34 via the communication lines cb1 and cb2. Specifically, the communication line cb1 connects the power feed unit 40 and the outdoor-unit control unit 17, whereas the communication line cb2 branches off in accordance with the number of indoor-unit control units 34 and connects the power feed unit 40 and the individual indoor-unit control units 34. The communication line cb1 is connected to the communication line cb2 via the power feed unit 40.

Each indoor unit 30 is connected to an external commercial power source (not illustrated) installed in the structure. During a normal operation, the indoor units 30 are operated by power fed from the commercial power source. The power feed unit 40 is an auxiliary power source for feeding, in a case where the commercial power source for at least one of the plurality of indoor units 30 is interrupted, in other words, in a case where power feed from the commercial power source to at least one indoor unit 30 is stopped, power to the indoor unit 30 for which the commercial power source (hereinafter simply referred to as a "power source") is interrupted. The communication line cb2 transmits power fed from the power feed unit 40 to the individual indoor units 30, in addition to a signal transmitted and received between the outdoor-unit control unit 17 and the individual indoor-unit control units 34.

(1-4) Remote Controller 50

The remote controller 50 is a device including a remote-controller control unit (not illustrated) that includes a microcomputer constituted by a CPU, a memory, and so forth, and a remote-controller input unit (not illustrated) that includes an input key for inputting various commands to the air conditioning system 100.

The number of remote controllers 50 included in the air conditioning system 100 is identical to the number of indoor units 30. The remote controllers 50 are associated with the indoor units 30 in a one-to-one relationship. Each remote controller 50 wirelessly communicates with the indoor-unit control unit 34 of the corresponding indoor unit 30 by using an infrared ray, a radio wave, and the like. In response to input of a command to the remote-controller input unit by a user, a manager, or the like, the remote controller 50 transmits a predetermined signal to the indoor-unit control unit 34 in accordance with the input command.

(1-5) Controller 60

In the air conditioning system 100, the outdoor-unit control unit 17 of the outdoor unit 10 and the indoor-unit control units 34 of the individual indoor units 30 (30*a*, 30*b*, 30*c*) are connected to each other via the communication lines cb1 and cb2 and the power feed unit 40, and thus the controller 60 is constituted. The controller 60 controls an operation of the air conditioning system 100.

(2) Operation of Air Conditioning System 100

When an operation start command is input to any one of the remote controllers 50 and control related to a cooling operation or a heating operation is executed by the controller 60, the four-way switching valve 12 is switched to a predetermined state, and the compressor 11 and the outdoor fan 15 are activated. After that, the indoor unit 30 corresponding to the remote controller 50 to which the operation start command has been input enters an operating state (a state in which the indoor fan 33 is operated).

(2-1) Cooling Operation

During a cooling operation, the four-way switching valve 12 is switched to a cooling cycle state (a state indicated by the solid lines in the four-way switching valve 12 in FIG. 1). When the individual actuators are activated in this state, refrigerant is sucked into the compressor 11 through the second pipe P2 and is compressed. The refrigerant discharged from the compressor 11 passes through the third pipe P3, the four-way switching valve 12, and the fourth pipe P4, and then flows into the outdoor heat exchanger 13.

The refrigerant flowed into the outdoor heat exchanger 13 exchanges heat with an air flow generated by the outdoor fan 15 and condenses. The refrigerant flowed out of the outdoor heat exchanger 13 passes through the fifth pipe P5 and the liquid connection pipe LP and flows into the individual indoor units 30.

The refrigerant flowed into each indoor unit 30 flows into the expansion valve 32. The refrigerant flowed into the expansion valve 32 is decompressed in accordance with the opening degree of the expansion valve 32. The refrigerant flowed out of the expansion valve 32 flows into the indoor heat exchanger 31, exchanges heat with an air flow generated by the indoor fan 33, and evaporates. The refrigerant flowed out of the indoor heat exchanger 31 passes through the gas connection pipe GP and flows into the outdoor unit 10.

The refrigerant flowed into the outdoor unit 10 passes through the first pipe P1, the four-way switching valve 12, and the second pipe P2, is sucked into the compressor 11 again, and is compressed.

(2-2) Heating Operation

During a heating operation, the four-way switching valve 12 is switched to a heating cycle state (a state indicated by the broken lines in the four-way switching valve 12 in FIG. 1). When the individual actuators are activated in this state, refrigerant is sucked into the compressor 11 through the second pipe P2 and is compressed. The refrigerant discharged from the compressor 11 passes through the third pipe P3, the four-way switching valve 12, the first pipe P1, and the gas connection pipe GP, and then flows into each indoor unit 30.

The refrigerant flowed into the indoor unit 30 flows into the indoor heat exchanger 31, exchanges heat with an air flow generated by the indoor fan 33, and condenses. The refrigerant flowed out of the indoor heat exchanger 31 flows into the expansion valve 32 and is decompressed in accordance with the opening degree of the expansion valve 32. The refrigerant flowed out of the expansion valve 32 passes through the liquid connection pipe LP and flows into the outdoor unit 10.

The refrigerant flowed into the outdoor unit 10 passes through the fifth pipe P5 and flows into the outdoor heat exchanger 13. The refrigerant flowed into the outdoor heat exchanger 13 exchanges heat with an air flow generated by the outdoor fan 15, and evaporates. The refrigerant flowed out of the outdoor heat exchanger 13 passes through the fourth pipe P4, the four-way switching valve 12, and the second pipe P2, is sucked into the compressor 11 again, and is compressed.

(3) Details of Controller 60

Next, a description will be given of control of an operation of the air conditioning system 100 performed by the controller 60 when a predetermined device (hereinafter referred to as a "target device") has been connected to or is connected to at least part of the plurality of indoor units 30 and the power feed unit 40 (hereinafter referred to as "in a device connection state").

In the present embodiment, the target device includes at least a humidifier 37 and a drain pump 35 installed in each indoor unit 30. In each indoor unit 30, the humidifier 37 and the drain pump 35 are connected to the indoor-unit control unit 34. The humidifier 37 and the drain pump 35 are connected to the power feed unit 40 via the indoor-unit control unit 34. The indoor-unit control unit 34 is capable of constantly recognizing that the humidifier 37 and the drain pump 35 have been connected to or are connected to the indoor unit 30 and the power feed unit 40.

The humidifier 37 has functions of natural drainage and forced drainage. Natural drainage is a function of draining off water generated by the humidifier 37 that is operating from the indoor unit 30 without using a drain pan and an external device. Forced drainage is a function of draining off water generated by the humidifier 37 that is operating from the indoor unit 30 by using a device such as the drain pump 35. In the present embodiment, forced drainage of the humidifier 37 is performed by storing water generated by the humidifier 37 in the drain pan and draining off the water stored in the drain pan by using the drain pump 35. During a cooling operation, the drain pump 35 is used to drain off drain water generated by the indoor heat exchanger 31 and stored in the drain pan. The indoor-unit control unit 34 of the indoor unit 30 does not recognize whether the current drainage mode of the humidifier 37 is natural drainage or forced drainage.

When the humidifier 37 is performing natural drainage during a heating operation, water generated by the humidifier 37 is not stored in the drain pan and thus a constant operation of the drain pump 35 is not necessary. On the other hand, when the humidifier 37 is performing forced drainage during a heating operation, water generated by the humidifier 37 is stored in the drain pan and thus a constant operation of the drain pump 35 is necessary. In other words, when the humidifier 37 is performing forced drainage, it is necessary to cause the drain pump 35 to operate at least while the humidifier 37 is operating. Thus, the drain pump 35 has a function of capable of operating in conjunction with the humidifier 37 in accordance with a setting.

The humidifier 37 performs natural drainage in a default setting. In the case of changing the drainage mode of the humidifier 37 from natural drainage to forced drainage, it is necessary for a worker or the like who is in charge of installation of the air conditioning system 100 to change the setting of the drainage mode and perform a necessary operation or the like on a site. At that time, the worker makes a setting necessary to cause the drain pump 35 and the humidifier 37 to operate in conjunction with each other. Also in the case of changing the drainage mode of the humidifier 37 from forced drainage to natural drainage, it is necessary for the worker to perform a necessary setting, operation, and the like on a site.

The controller 60 performs, in a device connection state, at least one of notification of a state of a target device and deactivation of at least one of functions of the target device.

Notification of a state of a target device (hereinafter referred to as "notification") includes, for example, notification of a fact that the target device has been connected to or is connected to at least part of the plurality of indoor units 30 and the power feed unit 40, and presentation of information about the target device. Information about the target device includes, for example, the type and number of target devices. Notification may be performed by, for example, issuing a warning using at least one of sound, light, and display. "Display" may be performed by, for example, displaying information such as an error code on the remote controller 50, a screen of a management server of the air conditioning system 100, and the like.

Deactivation of at least one of functions of the target device (hereinafter referred to as "deactivation") includes, for example, stop or limitation of power feed from the power feed unit 40 to the target device, and limitation of the functions of the target device. Deactivation is performed in a state in which the target device is connected to at least part of the plurality of indoor units 30 and the power feed unit 40. Under the setting of causing the drain pump 35 and the humidifier 37 to operate in conjunction with each other, deactivation includes stopping of the conjunction between the drain pump 35 and the humidifier 37.

The controller 60 performs at least one of notification and deactivation, for example, when a target device that consumes power exceeding a predetermined threshold has been connected. The predetermined threshold is determined on the basis of power that can be fed by the power feed unit 40 to the target device, for example, when a power source for at least one of the plurality of indoor units 30 is interrupted (hereinafter referred to as "at power source interruption"). At power source interruption, the power feed unit 40 feeds power to the indoor unit 30 for which the power source has been interrupted. At power source interruption, the controller 60 detects in advance a target device that consumes more power than the power that can be fed by the power feed unit 40 and performs at least one of notification and deactivation.

In the present embodiment, the controller 60 performs at least one of notification and deactivation at a test run, in a device connection state, and so forth. "At a test run" is, for example, at the time when the worker of the air conditioning system 100 performs a check operation when activating the air conditioning system 100 for the first time after installation. "In a device connection state" includes the time when a target device is connected, as described above. Thus, the controller 60 is capable of performing at least one of notification and deactivation while constantly monitoring the state of the target device.

Figure 2:
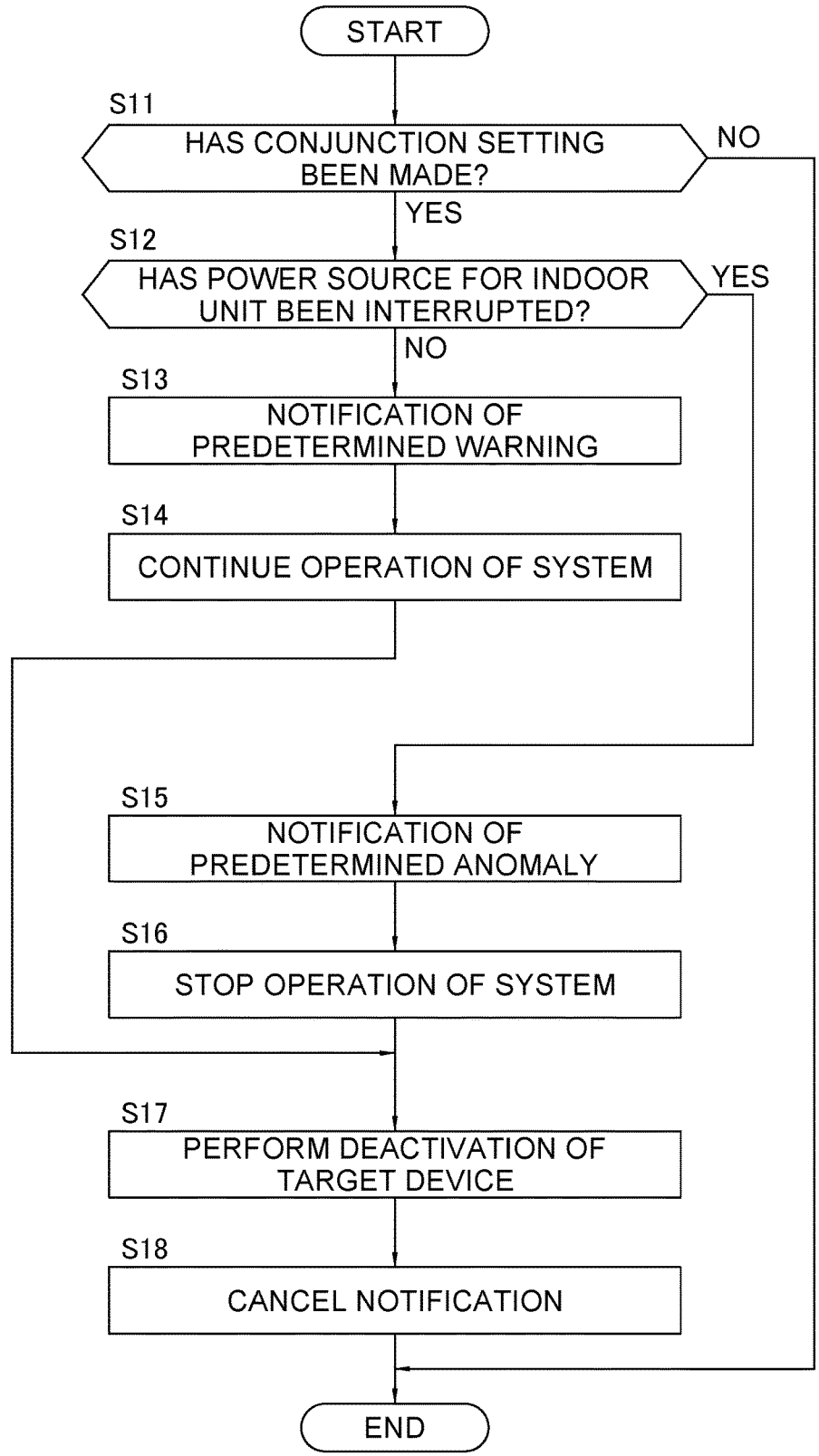
FIG. 2 is a flowchart of a process of notification and deactivation in the first embodiment.

Hereinafter, it is assumed that the power feed unit 40 is incapable of feeding necessary power to both the drain pump 35 and the humidifier 37 at power source interruption. FIG. 2 is a flowchart of a process of notification and deactivation performed by the controller 60. The individual steps illustrated in FIG. 2 will be described.

In step S11, it is determined whether a setting for causing the drain pump 35 and the humidifier 37 to operate in conjunction with each other (hereinafter referred to as a "conjunction setting") has been made. If the conjunction setting has been made, it is determined in step S12 whether a power source for the indoor unit 30 has been interrupted. If the conjunction setting has not been made, the process of notification and deactivation is not performed.

If it is determined in step S12 that the power source for the indoor unit 30 has not been interrupted (if power is fed from the power source), notification of a predetermined warning is performed in step S13. The predetermined warning is related to, for example, a fact that the conjunction setting has been made and a fact that the drain pump 35 and the humidifier 37 are connected. In this case, the drain pump 35 and the humidifier 37 are not fed with power from the power feed unit 40, and thus no problem occurs in the conjunction between the drain pump 35 and the humidifier 37 as long as the power source for the indoor unit 30 is not interrupted. Thus, in step S14, the controller 60 continues the operation of the air conditioning system 100 (the outdoor unit 10 and the indoor units 30).

If it is determined in step S12 that the power source for the indoor unit 30 has been interrupted, notification of a predetermined anomaly is performed in step S15. The predetermined anomaly is related to, for example, a fact that a target device (the drain pump 35 and the humidifier 37) that consumes more power than the power that can be fed by the power feed unit 40 is connected. In this case, in step S16, the controller 60 stops driving of the compressor 11 and stops the operation of the air conditioning system 100.

In step S17, the controller 60 performs deactivation of at least one of the drain pump 35 and the humidifier 37. Specifically, the controller 60 stops the conjunction between the drain pump 35 and the humidifier 37 and changes the drainage mode of the humidifier 37 from forced drainage to natural drainage. In this case, the controller 60 may stop power feed from the power feed unit 40 to at least one of the drain pump 35 and the humidifier 37 and may forcefully stop the conjunction between the drain pump 35 and the humidifier 37.

In step S17, the controller 60 may provide the worker with an instruction of prohibiting the conjunction between the drain pump 35 and the humidifier 37 instead of performing deactivation. For example, the controller 60 may instruct the worker to perform an operation of changing the drainage mode of the humidifier 37 from forced drainage to natural drainage, an operation of connecting at least one of the drain pump 35 and the humidifier 37 to a power source other than the power feed unit 40, an operation of removing the humidifier 37 from the air conditioning system 100, and the like. In this case, if the worker does not perform the operation in response to the instruction, the controller 60 may forcefully stop power feed from the power feed unit 40 to at least one of the drain pump 35 and the humidifier 37 or may forcefully stop the operation of the air conditioning system 100, for example.

As a result of the deactivation performed by the controller 60 or the operation performed by the worker, the power consumed by the target device becomes within the range of power that can be fed by the power feed unit 40. Accordingly, in step S18, the notification performed in step S13 or step S15 is canceled.

(4) Advantages

In the air conditioning system 100 of the present embodiment, one outdoor unit 10 and a plurality of indoor units 30 are connected to each other via the power feed unit 40 in an identical refrigerant system. In such a multi-type (multi-tenant) air conditioning system, it is important to, in a case where a power source for one of the plurality of indoor units 30 has been interrupted, maintain the operation of the entire system so as to minimize an influence on the operation of the other indoor units 30 for which a power source has not been interrupted.

Figure 3:
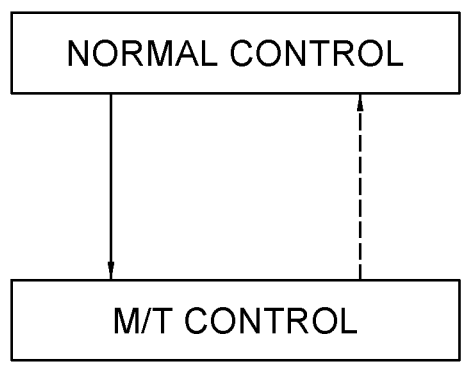
FIG. 3 is a diagram illustrating a control process of an operation of the entire air conditioning system 100.

FIG. 3 illustrates a control process of operation of the entire air conditioning system 100. As illustrated in FIG. 3, the entire air conditioning system 100 operates in a normal control mode or a multi-tenant control mode (hereinafter referred to as an "M/T control mode").

Normal control is normal operation control, which is adopted also in an existing system formed of one outdoor unit and one indoor unit. In the normal control mode, a power source for all the indoor units 30 of the air conditioning system 100 is not interrupted, and power is fed from an external power source. In the normal control mode, the air conditioning system 100 starts an air conditioning operation and shifts from a stopped state to a steady state (a state in which normal operation control is being performed), or strops an air conditioning operation and shifts from a steady state to a stopped state, in response to an operation of the remote controller 50 or the like. At a transition from a steady state to a stopped state, an oil return operation, a defrosting operation, and the like are performed if necessary.

The air conditioning system 100 that is operating in the normal control mode shifts to the M/T control mode in a case where the power source for at least one of the indoor units 30 is interrupted (see the solid-line arrow in FIG. 3). In the M/T control mode, at least one indoor unit 30 is in an operation stop state with the power source therefor being interrupted. In the M/T control mode, the indoor unit 30 for which the power source has been interrupted is fed with power from the power feed unit 40.

The controller 60 distinguishes the indoor unit 30 compatible with the M/T control mode (hereinafter referred to as an "M/T-compatible indoor unit") and the indoor unit 30 not compatible with the M/T control mode (hereinafter referred to as an "M/T-incompatible indoor unit") from each other. The M/T-compatible indoor unit 30 is capable of operating only with power fed from the power feed unit 40 at power source interruption. The M/T-incompatible indoor unit 30 is not connected to the power feed unit 40, or is incapable of operating only with power fed from the power feed unit 40 at power source interruption.

In the present embodiment, the controller 60 handles the indoor unit 30 for which a conjunction setting has been made as an M/T-incompatible indoor unit. The controller 60 handles the indoor unit 30 as an M/T-compatible indoor unit by execution of deactivation in step S17 in FIG. 2 or execution of a predetermined operation by the worker. Accordingly, the controller 60 is capable of shifting from the normal control mode to the M/T control mode at power source interruption.

According to the above, the air conditioning system 100 is capable of detecting in advance a target device that consumes more power than the power that can be fed by the power feed unit 40. At that time, the air conditioning system 100 is capable of normally continuing the operations of the outdoor unit 10 and the indoor units 30 even at power source interruption, by deactivating the detected target device.

Second Embodiment

An air conditioning system 100 according to a second embodiment will be described mainly regarding a difference from the air conditioning system 100 according to the first embodiment.

In the present embodiment, a target device includes a drain up kit and a drain pump kit for draining off drain water generated in the indoor unit 30. The drain up kit raises drain water to a predetermined height position and then allows the drain water to flow by its own weight through a pipe having a slope extending downward in a vertical direction, thereby draining off the drain water. The drain pump kit raises drain water to a predetermined height position and then pumps the drain water by driving a pump, thereby draining off the drain water.

Each indoor unit 30 is equipped with a drain up kit or a drain pump kit (hereinafter collectively referred to as a "drain kit"). In each indoor unit 30, the drain kit is connected to the indoor-unit control unit 34. The drain kit is connected to the power feed unit 40 via the indoor-unit control unit 34. The indoor-unit control unit 34 is capable of constantly recognizing that the drain kit has been connected to or is connected to the indoor unit 30 and the power feed unit 40.

The drain kit includes an interlock mechanism serving as a communication circuit for communicating with the indoor unit 30. The interlock mechanism has a function of forcefully stopping the operation of the indoor unit 30 connected to the drain kit when a malfunction of the drain kit occurs or when power feed to the drain kit stops.

Figure 4:
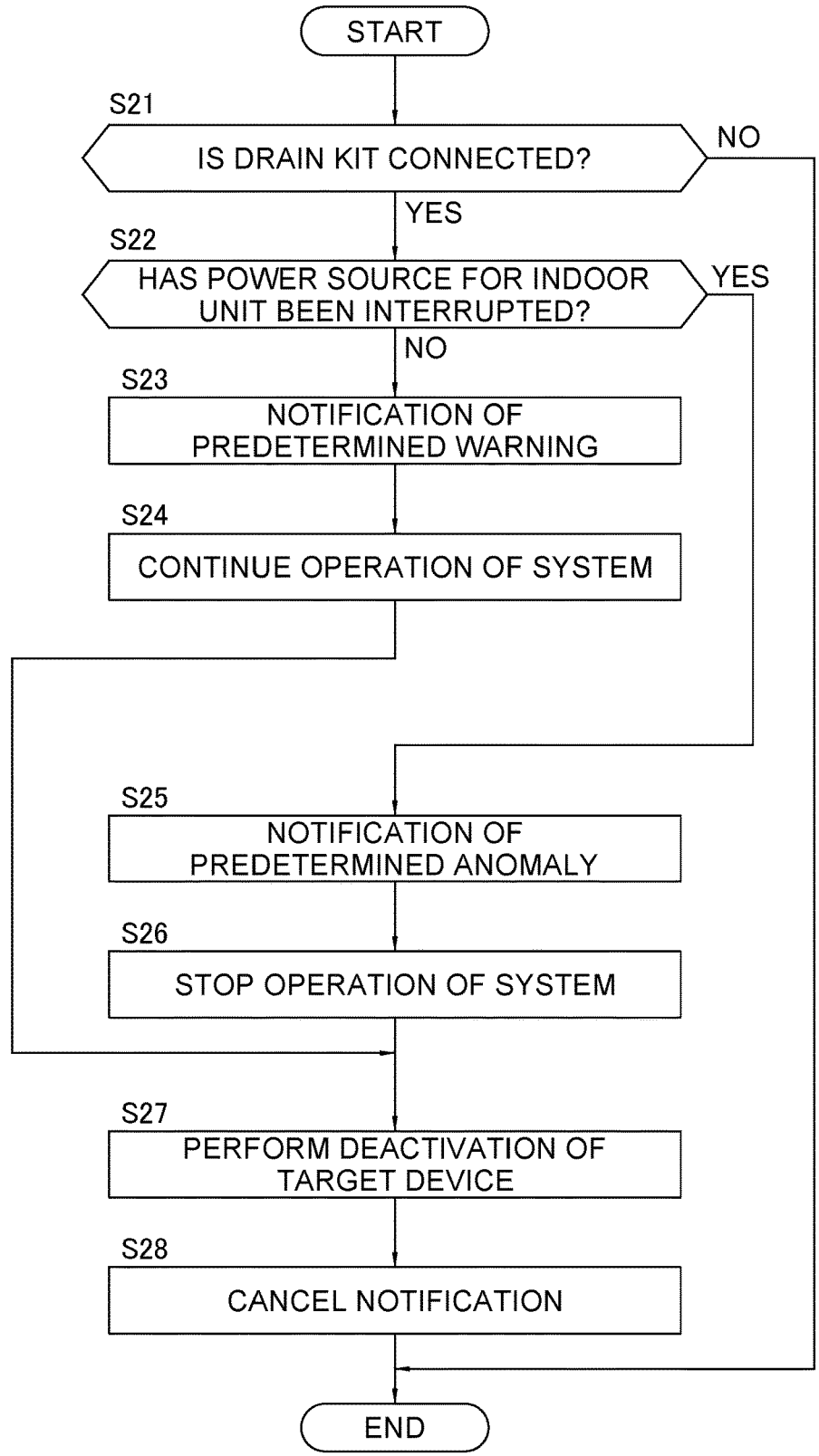
FIG. 4 is a flowchart of a process of notification and deactivation in a second embodiment.

Hereinafter, it is assumed that the power feed unit 40 is incapable of feeding necessary power to the drain kit at power source interruption. FIG. 4 is a flowchart of a process of notification and deactivation performed by the controller 60. The individual steps illustrated in FIG. 4 will be described.

In step S21, it is determined whether a drain kit is connected to the indoor unit 30. If the drain kit is connected, it is determined in step S22 whether a power source for the indoor unit 30 has been interrupted. If the drain kit is not connected, a process of notification and deactivation is not performed.

If it is determined in step S22 that the power source for the indoor unit 30 has not been interrupted (if power is fed from the power source), notification of a predetermined warning is performed in step S23. The predetermined warning is related to, for example, a fact that the drain kit is connected. In this case, the drain kit is not fed with power from the power feed unit 40, and thus no problem occurs in the operation of the drain kit as long as the power source for the indoor unit 30 is not stopped. Thus, in step S24, the controller 60 continues the operation of the air conditioning system 100 (the outdoor unit 10 and the indoor units 30).

If it is determined in step S22 that the power source for the indoor unit 30 has been interrupted, notification of a predetermined anomaly is performed in step S25. The predetermined anomaly is related to, for example, a fact that a target device (the drain kit) that consumes more power than the power that can be fed by the power feed unit 40 is connected. In this case, in step S26, the controller 60 stops driving of drain kit and the compressor 11 and stops the operation of the air conditioning system 100.

In step S27, the controller 60 performs deactivation of the drain kit. Specifically, the controller 60 stops driving of the drain kit.

In step S27, the controller 60 may instruct the worker to perform an operation of connecting the drain kit to a power source other than the power feed unit 40, an operation of removing the drain kit from the air conditioning system 100, and the like instead of performing deactivation. In this case, if the worker does not perform the operation in response to the instruction, the controller 60 may forcefully stop power feed to the drain kit or may forcefully stop the operation of the air conditioning system 100, for example.

As a result of the deactivation performed by the controller 60 or the operation performed by the worker, the power consumed by the target device becomes within the range of power that can be fed by the power feed unit 40. Accordingly, in step S28, the notification performed in step S23 or step S25 is canceled.

In the present embodiment, the controller 60 handles the indoor unit 30 connected to the drain kit as an M/T-incompatible indoor unit. The controller 60 handles the indoor unit 30 as an M/T-compatible indoor unit by execution of the deactivation in step S27 in FIG. 4 or execution of the predetermined operation by the worker. Accordingly, the controller 60 is capable of shifting from the normal control mode to the M/T control mode at power source interruption.

According to the above, the air conditioning system 100 is capable of detecting in advance a target device that consumes more power than the power that can be fed by the power feed unit 40. At that time, the air conditioning system 100 is capable of normally continuing the operations of the outdoor unit 10 and the indoor units 30 even at power source interruption, by deactivating the detected target device.

MODIFICATION EXAMPLES (1) Modification Example A

In the first embodiment, the controller 60 stops the operation of the air conditioning system 100 in a case where the power source for the indoor unit 30 has been interrupted under the conjunction setting, as illustrated in step S16 in FIG. 2. However, the controller 60 may continue the operation of the air conditioning system 100 in this case.

In the present modification, the controller 60 forcefully handles an M/T-incompatible indoor unit 30 as an M/T-compatible indoor unit 30 also at power source interruption. In this case, in a case where the humidifier 37 operates before the power source for the indoor unit 30 is interrupted, there is a possibility that risks of inner condensation and water leakage arise in the indoor unit 30. Thus, the controller 60 may issue a warning about the occurrence of these risks.

(2) Modification Example B

In the second embodiment, the controller 60 stops the operation of the air conditioning system 100 in a case where the power source for the indoor unit 30 has been interrupted in a state in which a drain kit is connected, as illustrated in step S26 in FIG. 4. However, in this case, the controller 60 may continue the operation of the air conditioning system 100 if it is determined that a drain pump residue operation of the indoor unit 30 connected to the drain kit has been normally performed. The drain pump residue operation is an operation of driving the drain pump 35 for a predetermined time to drain off the drain water remaining in the drain pan of the indoor unit 30.

In the present modification, the controller 60 forcefully handles an M/T-incompatible indoor unit 30 as an M/T-compatible indoor unit 30 also at power source interruption.

If the drain pump residue operation is not normally performed, the controller 60 reports the anomaly and forcefully stops the operation of the air conditioning system 100. To cancel the anomaly, it is necessary to drive the drain kit for a predetermined time after restarting the air conditioning system 100.

(3) Modification Example C

The controller 60 may stop the operations of the indoor units 30 and the outdoor unit 10 in a case where a predetermined anomaly is detected in the refrigerant circuit RC. For example, from the viewpoint of safety, the controller 60 may forcefully stop the operation of the air conditioning system 100 in a case where the temperature and pressure of refrigerant sealed in the refrigerant circuit RC have abnormal values.

(4) Modification Example D

The controller 60 may perform opening degree change control of the expansion valves 32 of the plurality of indoor units 60 in a predetermined order in the case of stopping the operation of the air conditioning system 100 due to the occurrence of an anomaly. The opening degree change control is control of closing the expansion valves 32 to reduce a risk at power source interruption. The risk includes, for example, a wetting risk in which liquid refrigerant flows into the suction pipe (first pipe P1) of the outdoor unit 10, and a water leakage risk caused by drain water generated in the indoor heat exchanger 31 of the indoor unit 30.

In this case, the controller 60 may sequentially perform opening degree change control of the plurality of expansion valves 32. Specifically, the controller 60 may perform opening degree change control of the plurality of expansion valves 32 while changing the expansion valves 32 as targets of opening degree change control in accordance with a predetermined order at a predetermined time interval. The order of the opening degree change control may be set on the basis of, for example, the opening degrees of the expansion valves 32 and the capacities of the indoor units 30 corresponding to the expansion valves 32.

(5) Modification Example E

The controller 60 may perform driving of drain devices (the "drain pumps 35" of the first embodiment or the "drain kits" of the second embodiment) of the plurality of indoor unit 60 in a predetermined order in the case of stopping the operation of the air conditioning system 100 in response to the occurrence of an anomaly.

In this case, in a case where the number of drain devices that can be simultaneously driven is one, the controller 60 may sequentially drive the plurality of drain pumps 35 such that the same drain device is not consecutively driven. Specifically, the controller 60 may drive the drain devices in accordance with a predetermined order at a predetermined time interval. The order of driving the drain devices may be set on the basis of, for example, outputs of float switches of drain pans, the capacities of the indoor units 30, and so forth.

(6) Modification Example F

Figure 5:
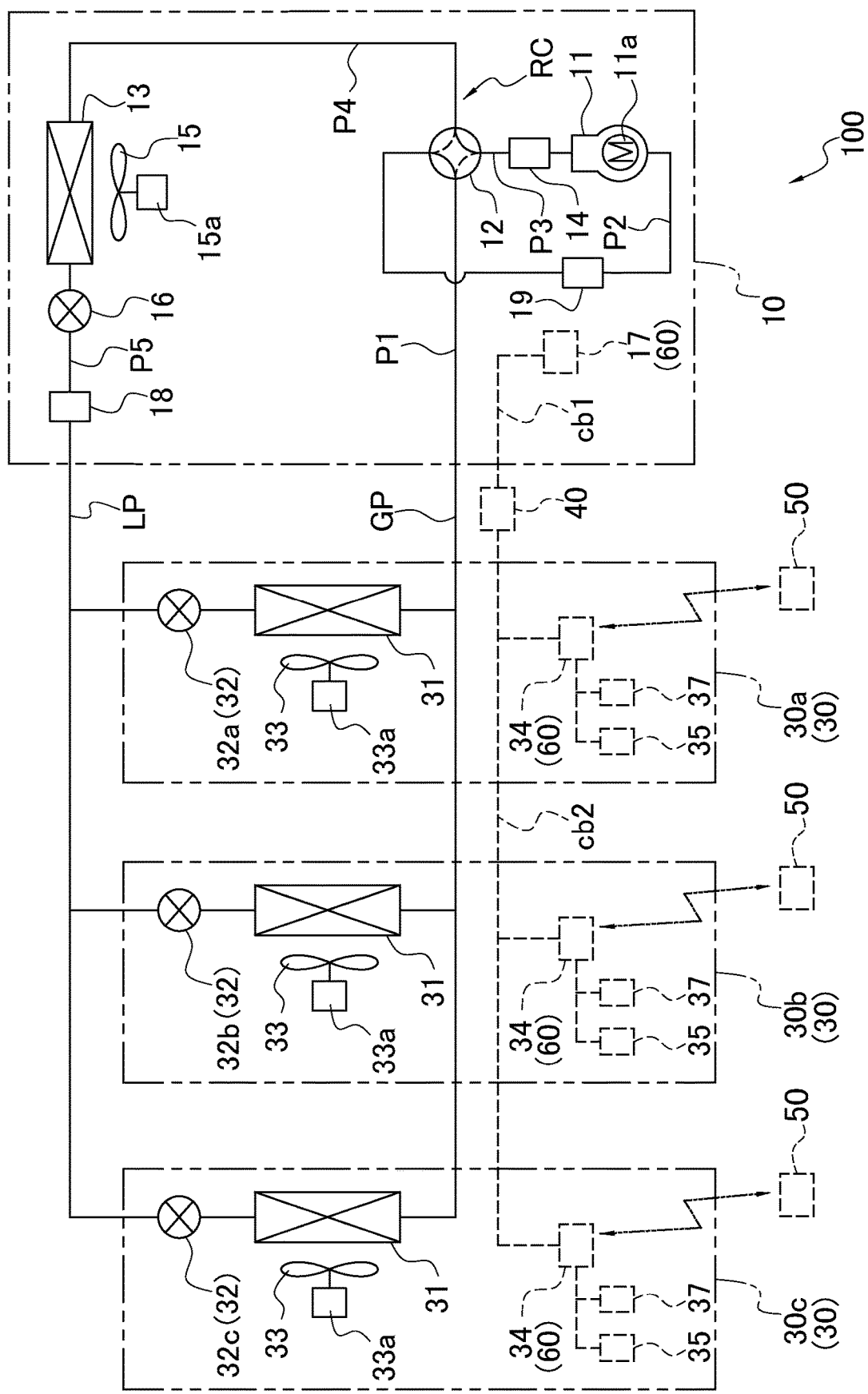
FIG. 5 is a schematic configuration diagram of an air conditioning system 100 according to modification example F.

The outdoor unit 10 may further include other elements not illustrated in FIG. 1. FIG. 5 is a schematic configuration diagram of an air conditioning system 100 according to the present modification example. In FIG. 5, the outdoor unit 10 further includes an oil separator 14, an expansion valve 16, a receiver 18, and an accumulator 19.

The oil separator 14 is attached to the third pipe P3. The oil separator 14 removes, from high-pressure gas refrigerant discharged from the compressor 11, lubricating oil mixed in the refrigerant.

The expansion valve 16 is attached to the fifth pipe P5. The expansion valve 16 is an electric valve capable of adjusting the opening degree thereof. While the air conditioning system 100 is operating, the expansion valve 16 is adjusted in the opening degree as appropriate in accordance with a situation, and decompresses refrigerant in accordance with the opening degree.

The receiver 18 is attached to the fifth pipe P5. The receiver 18 is attached between the expansion valve 16 and the liquid connection pipe LP. The receiver 18 temporarily stores refrigerant to absorb a change in the amount of refrigerant in the outdoor heat exchanger 13 and the indoor heat exchangers 31 in accordance with an operation status of the air conditioning system 100. The receiver 18 may include a mechanism for removing water and a foreign substance contained in the refrigerant circulating in the refrigerant circuit RC.

The accumulator 19 is attached to the second pipe P2. The accumulator 19 separates gas-liquid mixed refrigerant flowing in the refrigerant circuit RC into gas refrigerant and liquid refrigerant, and transfers only the gas refrigerant to the suction port of the compressor 11.

In FIG. 5, the outdoor unit 10 does not need to include the receiver 18 or the accumulator 19.

The details described in the embodiments and modification examples A to E can also be applied to the air conditioning system 100 illustrated in FIG. 5.

CONCLUSION

The embodiments of the present disclosure have been described above. It is to be understood that the embodiments and the details can be variously changed without deviating from the gist and scope of the present disclosure described in the claims.

INDUSTRIAL APPLICABILITY

An air conditioning system is capable of detecting in advance a device that consumes more power than the power that can be fed by a power feed unit.

REFERENCE SIGNS LIST 10 outdoor unit
30 indoor unit
35 drain pump
37 humidifier
40 power feed unit
60 controller
100 air conditioning system
RC refrigerant circuit (refrigerant cycle)

CITATION LIST

Patent Literature

[PTL 1] Japanese Unexamined Patent Application Publication No. 2013-40698

The invention claimed is:
1. An air conditioning system comprising:
a refrigerant cycle including an outdoor unit and a plurality of indoor units, each of the plurality of indoor-units including a respective indoor-unit controller;
an auxiliary power source that, in a case where a main power source for at least one indoor unit of the plurality of indoor units is interrupted, feeds power only to the at least one indoor unit for which the main power source is interrupted;
a plurality of predetermined devices connected to the respective indoor-unit controller of a respective one of the plurality of indoor units and the auxiliary power source via the respective indoor-unit controller, the plurality of predetermined devices capable of functioning in a plurality of modes, the plurality of modes including at least one forced mode in which at least some of the plurality of predetermined devices operate in conjunction with each other and at least one other mode in which the plurality of predetermined devices do not operate in conjunction with each other; and a controller configured to deactivate at least one of the plurality of predetermined devices in the at least one indoor unit by stopping the forced mode operation and starting the at least one other mode, when the main power source for the at least one indoor unit is interrupted and power consumed in the forced mode exceeds power that can be fed by the auxiliary power source, while feeding power from the main power source to remaining ones of the plurality of indoor-units.

2. The air conditioning system according to claim 1, wherein the controller is further configured to perform notification of a state of one or more of the plurality of predetermined devices by issuing a warning using at least one of sound, light, and display.

3. The air conditioning system according to claim 1, wherein one of the plurality of predetermined devices is a humidifier connected to the indoor unit, and an another one of the plurality of predetermined devices is a drain pump that operates in conjunction with the humidifier.

4. The air conditioning system according to claim 1, wherein the controller does not stop operation of the outdoor unit in a case where operation of the indoor unit has stopped with the plurality of predetermined devices being connected to the indoor unit.

5. The air conditioning system according to claim 1, wherein the controller is further configured to stop operation of the indoor units and the outdoor unit in a case where a predetermined anomaly has been detected in the refrigerant cycle.

6. The air conditioning system according to claim 2, wherein one of the plurality of predetermined devices is a humidifier connected to the indoor unit, and an another one of the plurality of devices is a drain pump that operates in conjunction with the humidifier.

7. The air conditioning system according to claim 2, wherein the controller does not stop operation of the outdoor unit in a case where operation of the indoor unit has stopped with the plurality of predetermined devices being connected to the indoor unit.

8. The air conditioning system according to claim 3, wherein the controller does not stop operation of the outdoor unit in a case where operation of the indoor unit has stopped with the plurality of predetermined devices being connected to the indoor unit.

9. The air conditioning system according to claim 2, wherein the controller is further configured to stop operation of the indoor units and the outdoor unit in a case where a predetermined anomaly has been detected in the refrigerant cycle.

10. The air conditioning system according to claim 3, wherein the controller is further configured to stop operation of the indoor units and the outdoor unit in a case where a predetermined anomaly has been detected in the refrigerant cycle.

11. The air conditioning system according to claim 4, wherein the controller is further configured to stop operation of the indoor units and the outdoor unit in a case where a predetermined anomaly has been detected in the refrigerant cycle.

* * * * *